(12) United States Patent
Barber et al.

(10) Patent No.: US 7,398,532 B1
(45) Date of Patent: Jul. 8, 2008

(54) SYSTEM AND METHOD FOR ESTABLISHING A SECURE EXECUTION ENVIRONMENT FOR A SOFTWARE PROCESS

(75) Inventors: Jeffrey S. Barber, Duluth, GA (US); Joseph K. Vossen, Duluth, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/517,366

(22) Filed: Mar. 2, 2000

(51) Int. Cl.
 *G06F 9/46* (2006.01)
 *G06F 12/14* (2006.01)

(52) U.S. Cl. .......................... 719/328; 718/100; 726/16

(58) Field of Classification Search ......... 709/100–104, 709/310–320, 328–330, 217–229; 713/200–202; 710/260–269; 718/100–104; 719/310–330; 726/16
See application file for complete search history.

(56) References Cited

U.S. PATENT DOCUMENTS

| | | | | |
|---|---|---|---|---|
| 5,305,456 | A * | 4/1994 | Boitana | 713/200 |
| 5,560,008 | A * | 9/1996 | Johnson et al. | 709/300 |
| 5,717,902 | A * | 2/1998 | D'Souza et al. | 717/162 |
| 5,784,463 | A * | 7/1998 | Chen et al. | 380/21 |
| 5,872,915 | A * | 2/1999 | Dykes et al. | 395/188.01 |
| 6,061,684 | A * | 5/2000 | Glasser et al. | 707/9 |
| 6,144,960 | A * | 11/2000 | Okada et al. | 707/10 |
| 6,279,111 | B1 * | 8/2001 | Jensenworth et al. | 713/200 |
| 6,289,462 | B1 * | 9/2001 | McNabb et al. | 713/201 |
| 6,393,569 | B1 * | 5/2002 | Orenshteyn | 713/201 |

FOREIGN PATENT DOCUMENTS

| | | |
|---|---|---|
| EP | 0573248 A1 | 8/1993 |
| EP | 0 573 248 A1 | 12/1993 |
| EP | 0579248 A1 | 1/1994 |

OTHER PUBLICATIONS

Brezinski, D. "Security Posture Assessment of Window s NT(R) Networks." [Online]. Available from Internet: < URL: http://w w w .blackhat.com/presentations/bh-usa-97/dominique.ppt > Jul. 9-10, 1997. See slides 6-11.
Palem et al. "G22.3250 Honors Operating System. Lecture 19: Security" [Online]. Available from Internet: < URL: http://www.cs.nyu.edu/courses/spring99/G22.3250-001/lectures/lect19.pdf > Apr. 6, 1999. See slides 7-19-20.

* cited by examiner

*Primary Examiner*—Li B Zhen

(57) ABSTRACT

A system and method for establishing a secure execution environment for a software process analyzes system application program interface (API) calls to determine whether the system API call executes a new program. If the system API call executes a new program, the system and method of the invention analyze the call to determine whether an execution environment, in the form of a plurality of attributes, is attached to an executable program file associated with the new program. An execution environment contains security attributes that are to be associated with the resulting process invoked by execution of the new program. If an execution environment is attached, the invention assigns the attributes of the execution environment to the new process, thereby ensuring that the new process includes the security features and capabilities specified in the execution environment.

27 Claims, 7 Drawing Sheets

SYSTEM AND METHOD FOR ESTABLISHING A SECURE EXECUTION ENVIRONMENT FOR A SOFTWARE PROCESS

TECHNICAL FIELD

The present invention relates generally to computer systems, and, more particularly, to a system and method for establishing a secure execution environment for a software process executed by a computer program.

BACKGROUND OF THE INVENTION

With the advent of, and ever increasing access to, the Internet, computer system security has become and continues to gain in importance. Typically, information to be accessed via the Internet (for example, but not limited to, a web site having one or more web pages) resides on a computer system, which is connected to the Internet. This computer system is referred to as a "web server." The computer system maintains the Internet information in a memory and executes what is referred to as a "web server program." When the web server program is executed, a process corresponding to the web server program is established on the computer. In this manner, those individuals wishing to access the web site over the Internet initiate, from their own computer, a web browser program, connect to the Internet, enter the required uniform resource locator (URL) associated with the web site sought, and then view the web pages corresponding to the web site.

Much information contained on web servers and exchanged over the Internet is confidential in nature. For example, a merchant operating a web site would like to maintain as confidential the credit card information that is received from customers over the Internet and stored on the merchant's web server.

Unfortunately, due to the nature of available web server programs, it can be relatively easy for an unauthorized individual to access a web server through an Internet web site and gain access to confidential information. Furthermore, all programs that execute on a computer have corresponding processes associated therewith. For example, each time a word processing program is initiated on a computer, a corresponding process executes within the computer so that the word processor program may operate. Indeed, each time any computer program is initiated, a corresponding process is launched to enable the program to run. Each process runs in a unique, protected domain encompassing its program code, data and other resources. Each of these processes communicate in what is called the "user mode" through an application program interface (API), with what is known as a "kernel." Each process initiates "system calls," through which the process communicates with the kernel in what is referred to as "kernel mode." When operating in kernel mode, the kernel utilizes certain protected functions of the computer processor (not available to user mode programs) in order to execute functions requested by the process.

Part of the functionality of the kernel is to assign and maintain a list of attributes for each process. Among other uses, the attributes are used by the kernel to perform an access control function, so that, for example, a particular process while executing on behalf of a particular user has access privileges assigned that may be different from that of processes operating on behalf of other users. In many cases, a number of different programs execute in processes that have been assigned identical sets of attributes. In these cases, the kernel is unable to apply different access control criteria to the different processes, and a process may thus be vulnerable to various flaws that can cause it to corrupt data or resources belonging to another process.

Therefore, it would be desirable to secure the contents of a program/process, such as a web server program, by compartmentalizing the process in which each program operates and to control the capabilities granted to the process by dynamically assigning a unique differentiable set of attributes to it.

SUMMARY OF THE INVENTION

The invention provides a system and method for creating a secure execution environment in which a program may execute.

The invention may be conceptualized as a system for establishing a secure execution environment for a software process executed by a program operating on a computer, comprising a software process including a plurality of attributes operating on a computer, an operating system kernel in communication with the software process and in communication with an executable file to be accessed by the software process, and a system call trap associated with the operating system kernel, the system call trap configured to assign a selected plurality of the attributes to the software process, the selected plurality of attributes stored in association with the executable file.

The invention may also be conceptualized as a method for establishing a secure execution environment for a software process executed by a program operating on a computer, the method comprising the steps of: operating a software process including a plurality of attributes on a computer, executing an operating system kernel in communication with the software process, the operating system kernel in communication with an executable file to be accessed by the software process, and assigning a selected plurality of the attributes to the software process, the selected plurality of attributes stored in association with the executable file.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Figure 1:
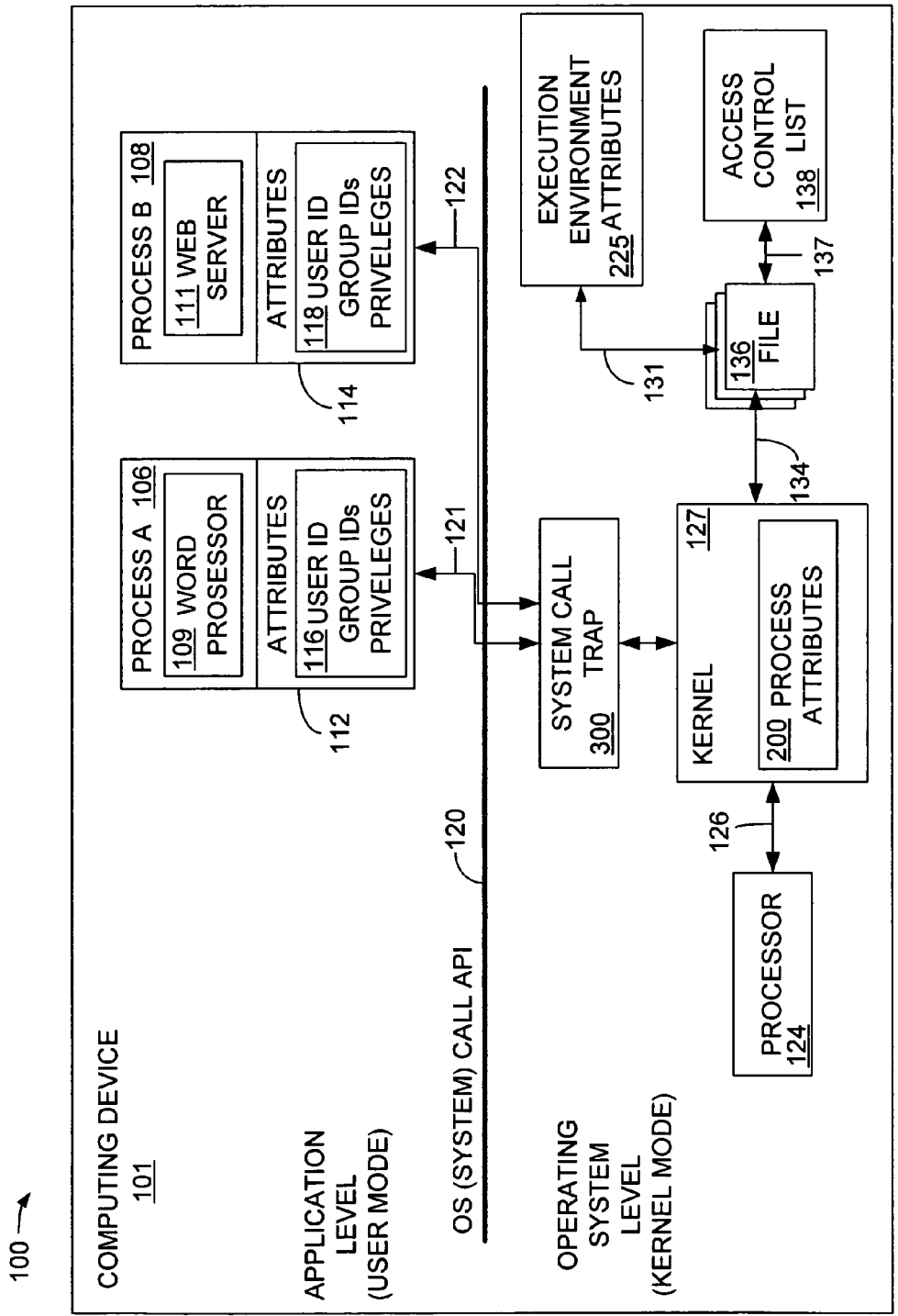
FIG. 1 is a schematic view illustrating the execution environment system in accordance with an aspect of the invention.

The invention to be described hereafter is applicable to all computer programs that execute within a discrete, protected domain of execution on a computing device and that have access control, and other attributes. Furthermore, while described below in a single computer environment, the system and method for creating a secure execution environment can be implemented in a networked computing arrangement in which a number of computing devices communicate over a local area network (LAN) or over a wide area network (WAN).

The system and method for creating a secure execution environment can be implemented in hardware, software, firmware, or a combination thereof. In the preferred embodiment(s), the invention is implemented in software or firmware that is stored in a memory and that is executed by a suitable instruction execution system. If implemented in hardware, as in an alternative embodiment, the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The secure execution environment program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 1 is a schematic view illustrating the execution environment system 100 in accordance with an aspect of the invention. Execution environment system 100 includes process A 106 and Process B 108. A process is invoked each time that an application program is launched. For example, process A 106 is invoked when word processor 109 is launched. Word processor 109 is commonly referred to as an "application program." When word processor 109 is launched, a process (process A 106) corresponding to the word processor application 109 is created within computing device 101. Process A 106 further includes attributes 112, which are maintained within a kernel 127 (to be described below), and can include one or more credentials 116, such as user ID, group IDs, and privileges. Although illustrated within process A 106, the attributes 112, while logically connected to process A 106, are maintained by the kernel 127 (to be discussed below). Furthermore, although illustrated using word processor 109, the program executed can be any application program running on computing device 101.

As shown in FIG. 1, computing device 101 also executes web server 111, which when launched, invokes process B 108. Similar to that described above with respect to process A 106, process B 108 is also associated with corresponding attributes 114, which are also maintained by the kernel 127, and which may include credentials 118, such as user ID, group IDs and privileges. The attributes fall into three general categories as follows.

1) Identifiers: identify either the particular user on whose behalf the process is executing, or one of a number of different groups to which a user might belong (on which various access control decisions might be based: i.e. you can only execute this program if you belong to the "administrators" group).

2) Privileges: one of a number of discrete individually assignable tokens (to be described below) that can be granted to a process. These are typically used to grant a special capability. For example, on the Windows NT operating system, only if a process holds the "SeSystemtimePrivilege" privilege can it set the computer's notion of the time, or only if the process holds the "SeAuditPrivilege", can one configure, enable or disable auditing on the system. Similarly, only if the process holds the "SeShutdownPrivilege", can the operating system be instructed to shut the system down.

3) Other attributes: For example, on the Windows NT operating system, this would include assigning the "default owner" ID to any newly created file, or assigning the default access control list to a newly created file.

Furthermore, although illustrated using only two processes, the execution environment system 100 of the invention is capable of supporting many additional application programs and their corresponding processes, such as, for example but not limited to, a file transfer process, a mail server process, etc. Further still, it is contemplated that an application program may have more than one process running simultaneously.

Computing device 101 also includes system call application program interface (API) 120. The functionality described above with regard to process A 166 and process B 108 occur at the application level, or what is referred to as the "user mode." The functionality to be described below, and on the opposite side of API 120 from the user mode, occurs in what is known as the operating system level, also referred to as the "kernel mode." For example, process A 106 communicates with kernel 127 through system call trap 300 via connection 121, and process B 108 communicates with kernel 127 through system call trap 300 via connection 122. The communication between the processes 106 and 108, and kernel 127 occur using API 120 through the use of what are known as "system calls." The system calls allow those processes operating in the user mode to communicate via the API 120 with those elements operating in the kernel mode.

Kernel 127 includes process attributes 200, which correspond to the attributes 112 and 114 described above. Kernel 127 communicates via connection 126 with processor 124 and communicates with file 136 via connection 134. Illustratively, file 136 is a file that is accessed by, for example, process A 106 or process B 108. For example, file 136 can be an executable program file, such as a word processing document that word processor 109 desires to access. Typically, there are many executable files 136 maintained in a storage device (not shown) residing within computing device 101.

File 136 is representative of one or more executable files associated with any application program that might be running on computing device 101. Each instance of file 136 also includes an associated unique access control list 138, shown via connection 137. Access control list 138 includes information relating to users and the users' access to the particular file 136. File 136 is also associated with execution environment attributes 225 via connection 131. In accordance with an aspect of the invention, the execution environment attributes 225 are associated with each stored executable program file 136, and can be used to define the contents of the attributes assigned to newly created processes to be explained below.

In accordance with an aspect of the invention, system call trap 300 (to be described in further detail below) intercepts system API calls destined for kernel 127 from process A 106 and process B 108. System call trap 300, in cooperation with kernel 127 uses the execution environment attributes 225 to develop the process attributes 200 within kernel 127, in order to assign the appropriate attributes to processes 106 and 108.

As mentioned above, each program executing on computing device 101 includes an associated process, such as process A 106 associated with word processor 109 and process B 108 associated with web server 111. The kernel 127 maintains a process table with one entry for each process. A process table entry contains the process attributes 200 associated with each process. In operation, the word processor 109 and the web server 111 request services (such as opening a file, reading a directory, allocating memory, etc.) from the kernel 127 by issuing a system API call via connections 121 and 122, respectively, via API 120. The kernel 127 responds to those system API calls in accordance with the process attributes 200.

Figure 2:
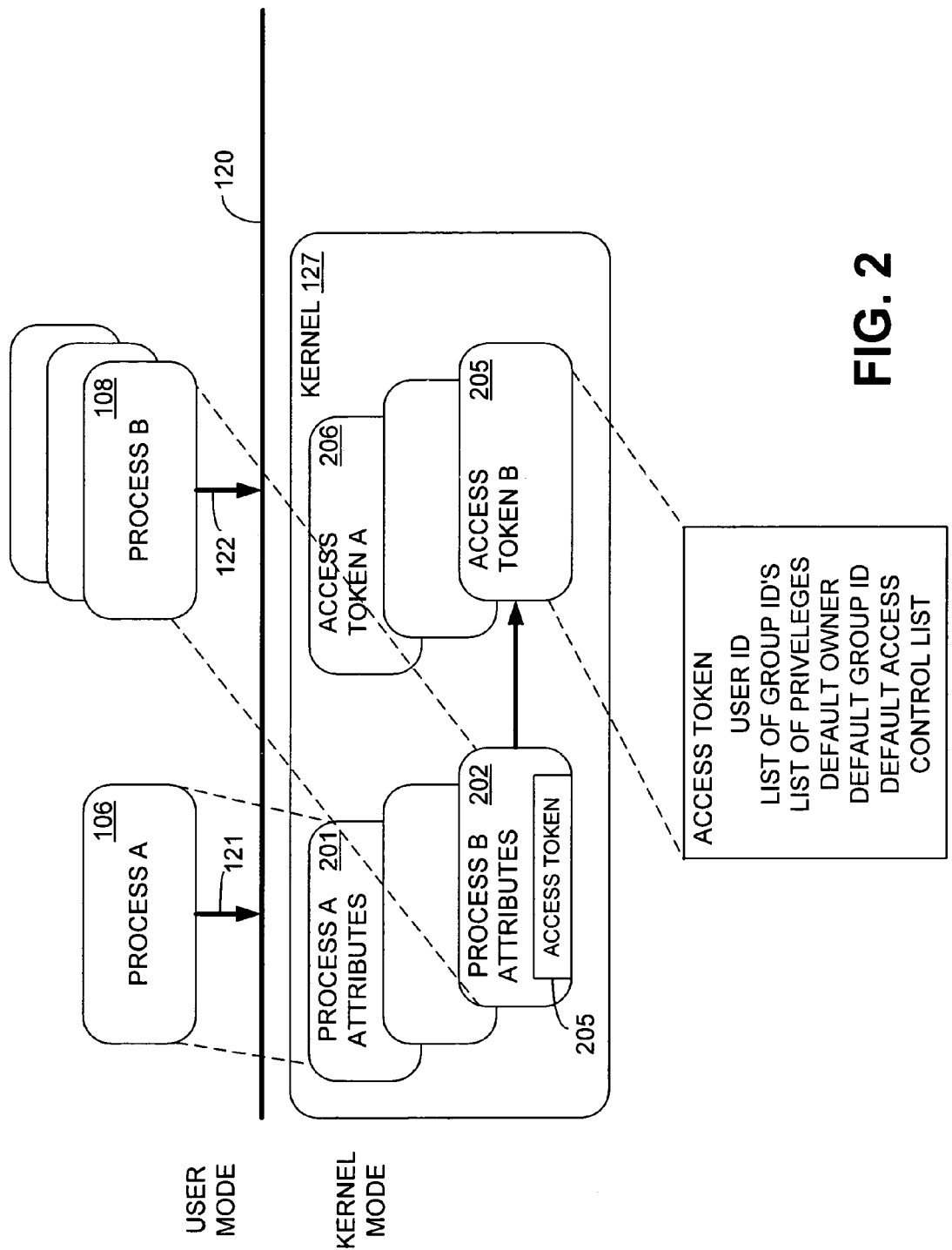
FIG. 2 is a block diagram illustrating, in further detail, the kernel of FIG. 1.

FIG. 2 is a block diagram illustrating, in further detail, the kernel 127 of FIG. 1. As shown in FIG. 2, kernel 127 contains process A attributes 201, which correspond to process A 106, and contains process B attributes 202 which correspond to process B 108. The process A attributes 201 contained within kernel 127 correspond to the attributes 112 of FIG. 1, and the process B attributes 202 correspond to the attributes 114 of FIG. 1. Kernel 127 also includes an access token A 206 corresponding to process A attributes 201 and process A 106, and includes access token B 205, which corresponds to process B attributes 202 and process B 108.

For example, access token B 205 includes the security attributes associated with process B 108 (including the credentials 118 (FIG. 1) associated with the user under whose logon the process is executing). As mentioned above, credentials 116 associated with process A 106 and credentials 118 associated with process B 108 can include the user ID, group IDs and a list of privileges (special user rights).

Figure 3:
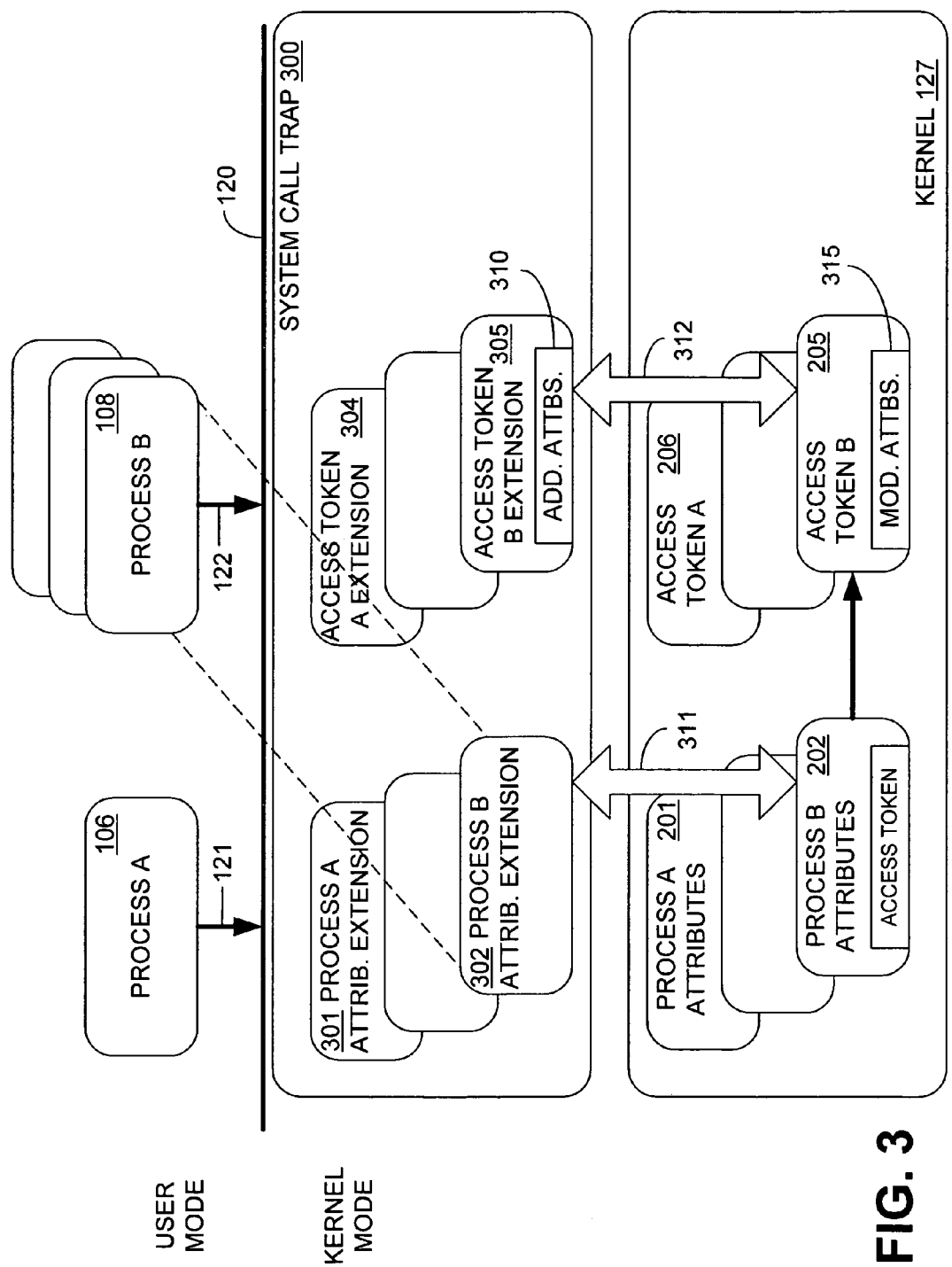
FIG. 3 is a block diagram illustrating, in further detail, the system call trap of FIG. 1.

FIG. 3 is a block diagram illustrating, in further detail, the system call trap 300 of FIG. 1. As shown in FIG. 3, system call trap 300 resides at the operating system level (kernel mode), logically located between kernel 127 and the processes (A 106 and B 108) that execute on computing device 101. The system call trap 300 intercepts system API calls sent through API 120 before they reach the kernel 127. The system call trap 300 manipulates the system API call parameters prior to forwarding the calls to the kernel 127. In accordance with an aspect of the invention, the system call trap 300 may modify the contents of access tokens, corresponding to the processes, as the processes and access tokens are created. For example, system call trap 300 includes process A attribute extension 301 and process B attribute extension 302. Process B attribute extension 302 corresponds to process B attributes 202 and process B 108. Process B attribute extension 302 corresponds to process B attribute 202 via connection 311.

Furthermore, process A attribute extension 301 is associated with a corresponding access token A extension 304, and process B attribute extension 302 is associated with a corresponding access token B extension 305. Access token B extension 305 corresponds to access token B 205 via connection 312. Access token B 205 may include modified attributes 315, and access token B extension 305 may include additional attributes 310, which are logically added to process B 108 through the operation of the invention. The creation of the modified attributes 315 and the additional attributes 310 will be explained in detail below.

Process B attribute extension 302 is maintained in what is referred to as a "shadow table" linked via connection 311 to process B attributes 202. Similarly, access token B extension 305 is maintained in a shadow table that is linked via connection 312 to access token B 205. In this manner, system call trap 300 can intercept API calls between processes executing in the user mode and kernel 127, and can add attributes to each executing process. The additional attributes 310 in access token B extension 305 and the modified attributes 315 in access token B 205 are obtained from the execution environment attributes 225 (FIG. 1) that will have been previously stored as an attachment to the stored executable program file 136 (FIG. 1).

Figure 4:
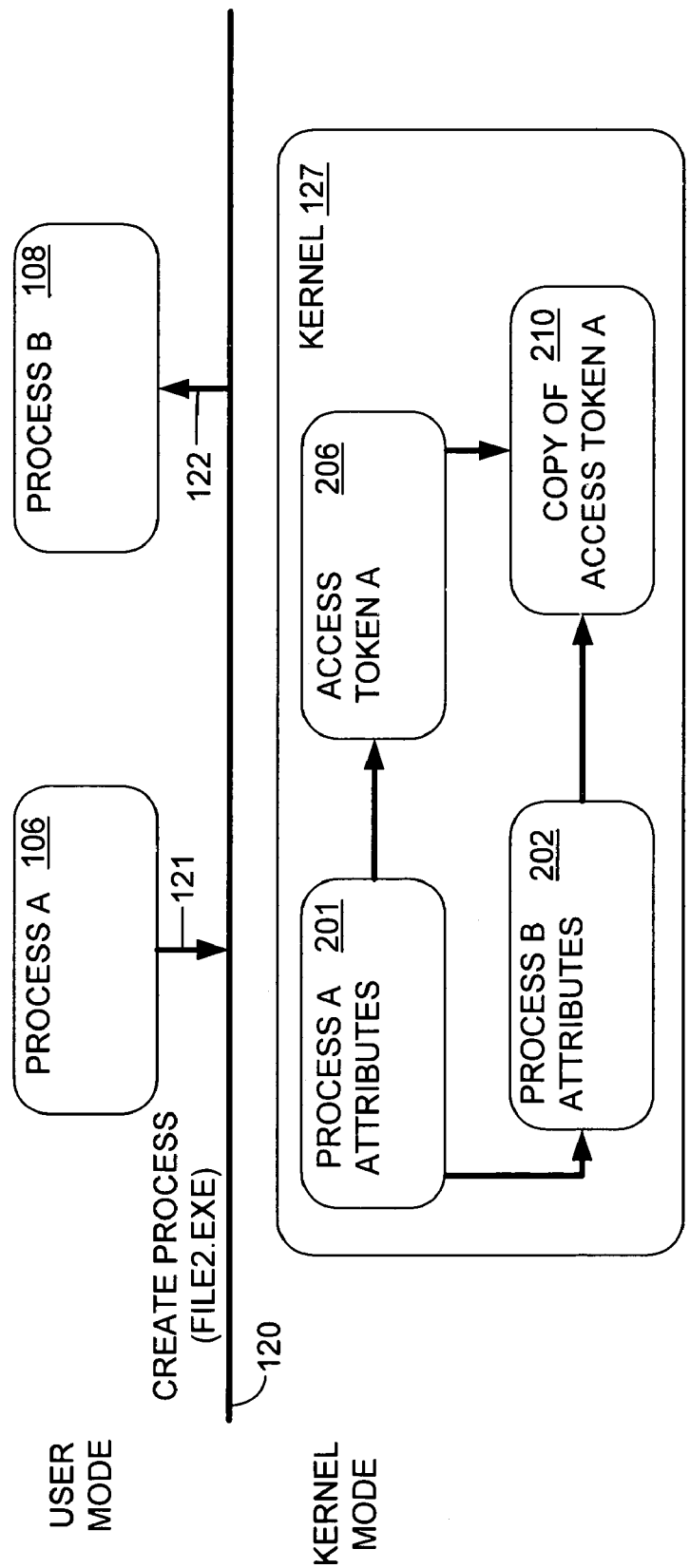
FIG. 4 is a block diagram illustrating the kernel of FIG. 1 and the effect of a "createprocess" system API call.

FIG. 4 is a block diagram illustrating the kernel 127 of FIG. 1 and the effect of a "createprocess" system API call on the kernel 127. In the example shown in FIG. 4, process A 106 is executing and sends a "createprocess" system API call via connection 121 through API 120. In this example, process A attributes 201 and access token A 206 are already in place. During initial system start, or "boot-up", a portion code executes in the operating system that creates the very first process. Subsequently, a new process is always created by an existing process through execution of a createprocess system API call as mentioned above. Continuing with the example, when the createprocess API call is sent, process B attributes 202 are invoked, and a copy of access token A 210 is created from access token A 206. In this manner, the contents of access token A 206 are automatically assigned to the process B attributes 202 in the form of a copy of access token A 210. In this example, the attributes assigned to process B 108 are the same as those assigned to process A 106.

Figure 5:
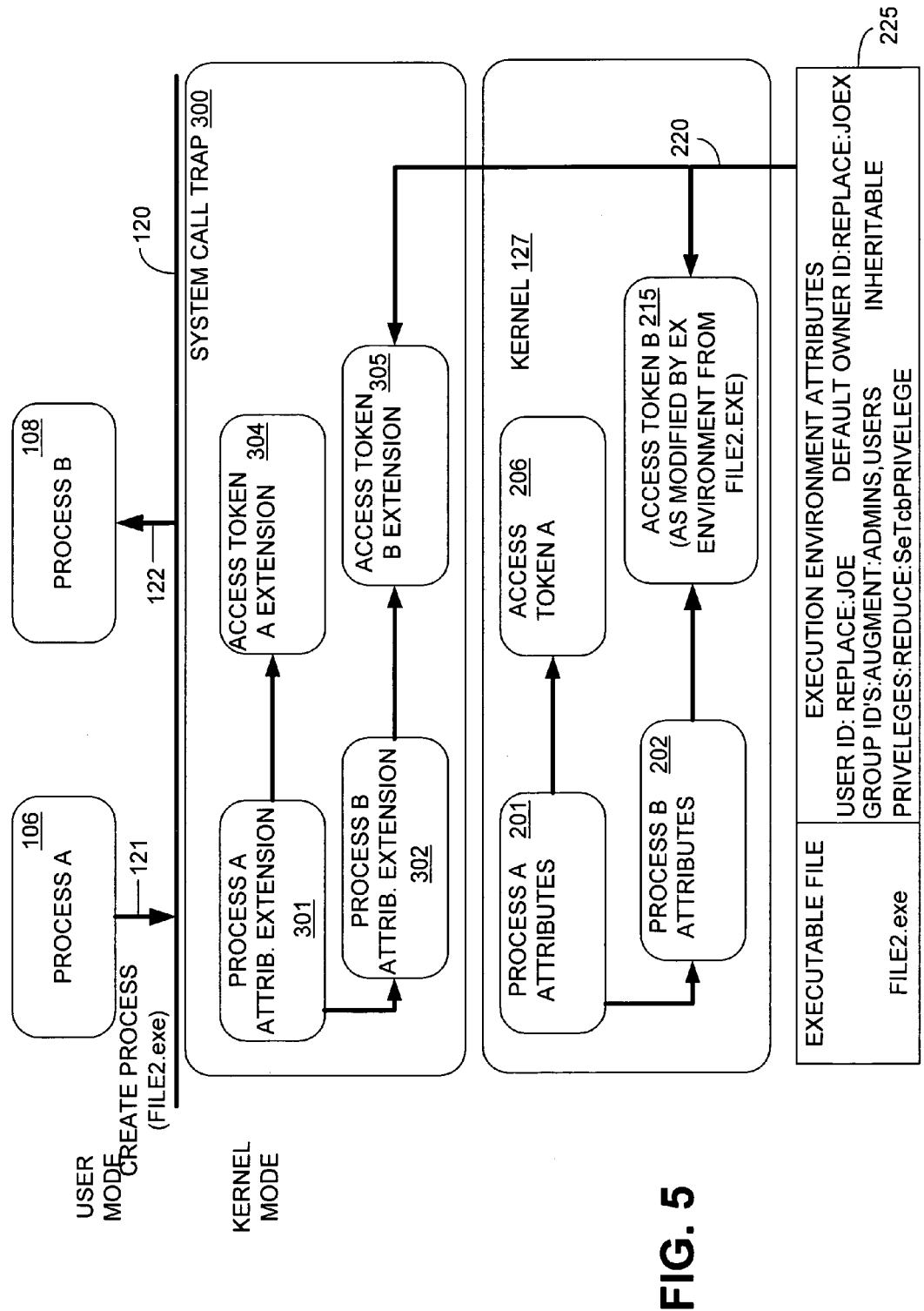
FIG. 5 is a block diagram illustrating the kernel and system call trap of FIG. 1 in accordance with an aspect of the invention.

FIG. 5 is a block diagram illustrating the kernel 127 and system call trap 300 of FIG. 1 in accordance with an aspect of the invention. The execution environment of the invention is an additional set of security attributes and associated flags that can be associated with a stored executable program file (i.e., execution environment attributes 225 associated with file 136 of FIG. 1), such that when the program file is executed, the new process's access token is modified as specified by the information in the execution environment. The additional attributes may augment, reduce or completely replace the corresponding attributes (that would ordinarily be copied from the first process's access token). The ability to dynamically assign these attributes allows a heretofore unrecognized level of control over process security attributes. Each execution environment contains a flag indicating whether the attributes specified are also to be applied to processes subsequently created by the affected process, or whether subsequently created processes should revert to the original set of attributes. This flag is referred to as the "inheritable flag."

Referring now to FIG. 5, assuming that process A 106 is executing, a createprocess system API call is communicated via connection 121 through API 120 to kernel 127, and intercepted by system call trap 300. Process A attributes 201 and access token A 206, within kernel 127, already exist because process A 106 is currently executing. Similarly, process A attribute extension 301 and access token A extension 304, within system call trap 300, already exist. The createprocess system API call is used by an existing process, such as process A 106, to create a new process, such as process B 108. One of the parameters to the system API call is the name of the stored executable program file 136 (FIG. 1) containing the processor instructions for the new process. When the createprocess system API call from process A 106 is intercepted by system call trap 300, and in accordance with an aspect of the invention, process B attributes 202 and process B attribute extension 302 are created. In accordance with the execution environment of the invention, access token B 215 (as modified by the execution environment attached to the stored program file specified in the createprocess system API call) is created using the execution environment attributes 225. The execution environment attributes 225 can be any attributes associated with a program file, and are provided to access token B 215 via connection 220. Similarly, the access token B extension 305, corresponding to process B attribute extension 302, also includes the execution environment attributes 225 supplied via connection 220. In this manner, the execution environment dictates to the kernel 127 the attributes assigned to process B 108. In this manner, the security attributes associated with a process can be altered or replaced based on the execution environment attributes attached to the stored program file represented by block 225.

Figure 6A:
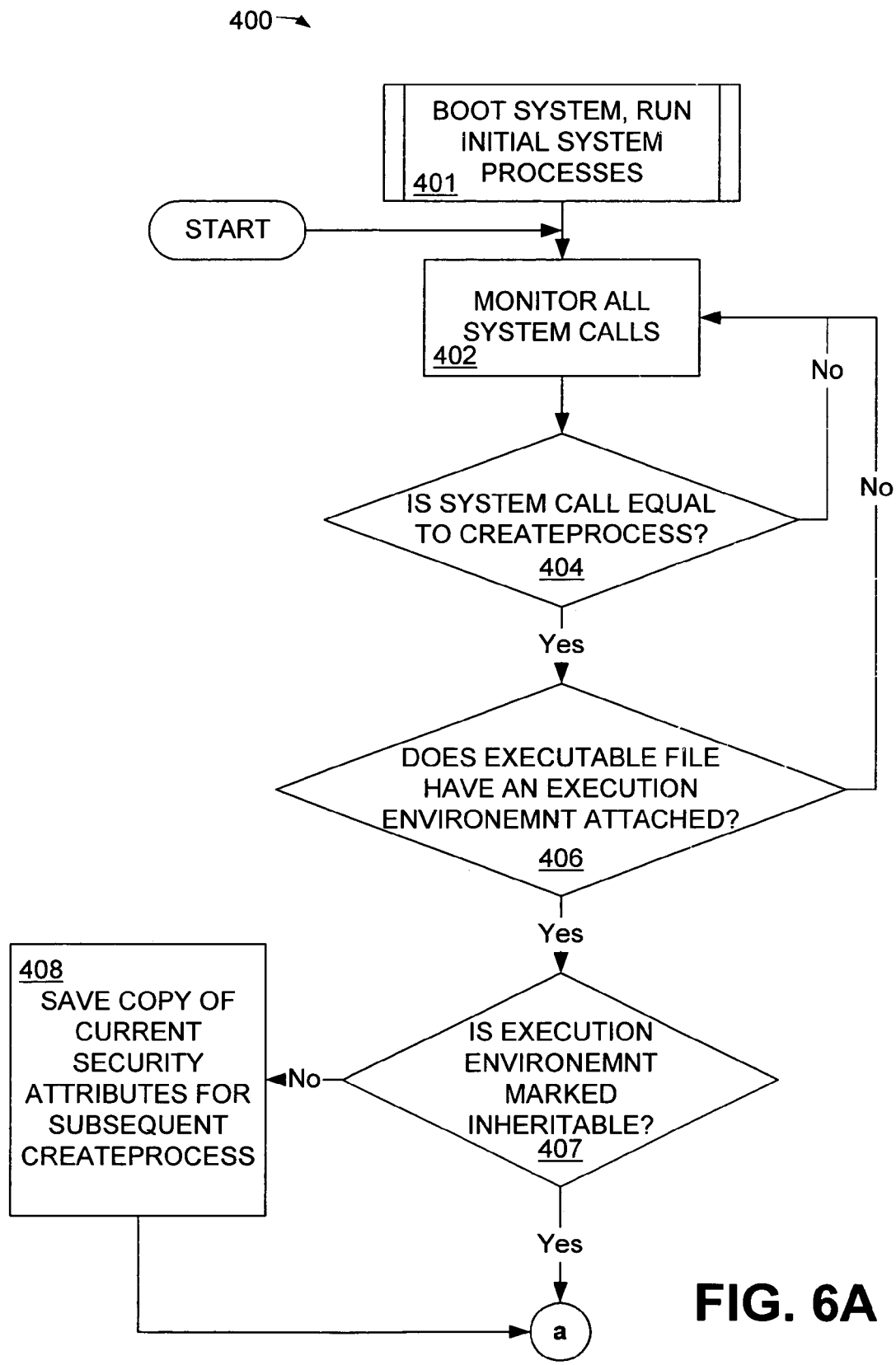
FIGS. 6A and 6B are flow charts collectively illustrating the operation of the invention.
Figure 6B:
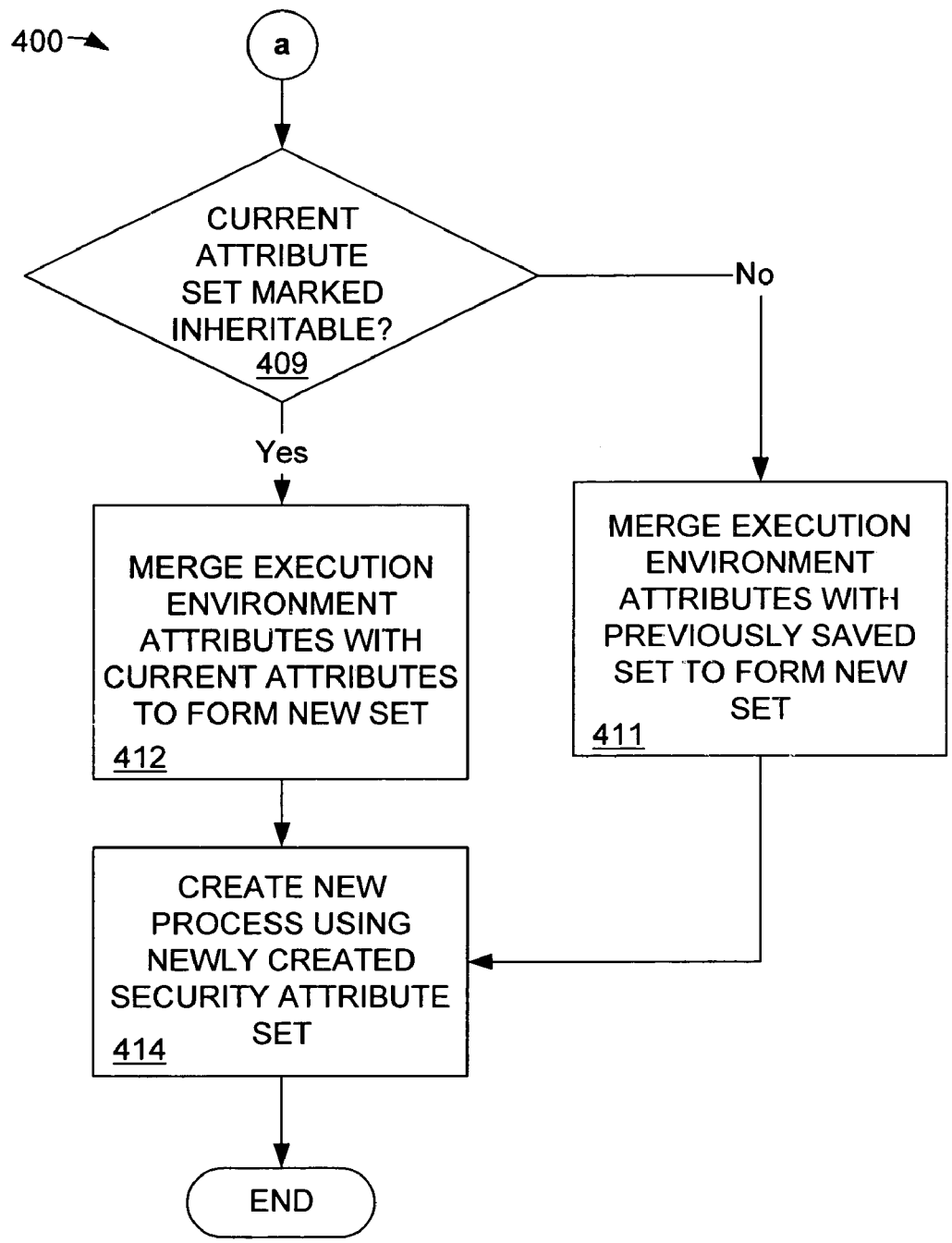

FIGS. 6A and 6B are flow charts collectively illustrating the operation of the invention. The flow charts of FIGS. 6A and 6B show the architecture, functionality, and operation of a possible implementation of the secure execution environment software of the invention. In this regard, each block represents a module, segment, or portion of code, which comprises one or more executable instructions for implementing the specified logical function(s). It should also be noted that in some alternative implementations, the functions noted in the blocks may occur out of the order noted in FIG. 6A. For example, two blocks shown in succession in FIG. 6A may in fact be executed substantially concurrently or the blocks may sometimes be executed in the reverse order, depending upon the functionality involved, as will be further clarified below.

With reference now to FIG. 6A, in block 401 the computing device 101 is "booted up" and runs initial system processes. In block 402, the system call trap 300 monitors all system API calls over API 120 (FIG. 5). In block 404 it is determined whether a system API call intercepted by system call trap 300 is a "create process" system API call. If the system call detected by system call trap 300 is not a createprocess system API call, then the process returns to block 402 and system call trap 300 continues to monitor API 120 for system API calls.

If, in block 404, system call trap 300 detects a "createprocess" system API call, then in block 406 it is determined whether the stored program file specified in the intercepted createprocess system API call has an execution environment (225 of FIG. 5) attached. If the file does not have an execution environment attached then the process returns to block 402. If the files does have an attached execution environment, such as that illustrated in FIG. 5, then in block 407 it is determined whether the execution environment is marked inheritable, via the inheritable flag mentioned above. If the execution environment is not marked inheritable, then in block 408 a copy of the current security attributes are saved for a subsequent "createprocess" system API call. These saved security attributes are stored in the access token B extension 305 of FIG. 5.

If it is determined in block 407 that the detected system API call includes an inheritable execution environment, then in block 409, and with reference now to FIG. 6B, it is determined whether the current attribute set is marked inheritable. If the current attribute set is not marked inheritable, then in block 411 the detected execution environment attributes are merged with the previously saved set (block 408) to form a new set of attributes.

If, in block 409, the current attribute set is marked inheritable, then in block 412 the execution environment attributes are merged with the current attributes to form a new set. In block 414, a new process (e.g., process B 108 of FIG. 5) is created using the newly created security attribute set (225 of FIG. 5).

In accordance with an aspect of the invention, the execution environment allows a computer system operator, or administrator, enhanced control over the operation of the computer system. By attaching execution environment attribute sets to various executable program files, the administrator can easily control the credentials and capabilities under which the various programs operate, irrespective of the identity of the invoking user. In particular, the administrator can utilize the invention to achieve one of two primary effects, depending on whether the inheritable flag is enabled. The first, obtained when the inheritable flag is not enabled, allows the administrator to alter the security attributes or capabilities of a single program without conferring any additional capability on any subsequent process it may spawn. The second effect, obtained when the inheritable flag is enabled, allows the administrator to establish or re-establish the security attributes or capabilities of an entire process hierarchy (i.e. the executed process together with any processes it spawns and any process spawned by any descendant).

In a typical configuration, only a few key program files may have an execution environment assigned. Other processes would simply inherit attributes from their predecessors. For example, the administrator can use these different attributes to effectively isolate a program (e.g., program 109 of FIG. 1) by performing the follow steps. Create a new "user" account for the program. Create an execution environment (e.g., execution environment 225 of FIGS. 1 and 5) associated with the program, assigning to it the newly created User ID, with that same User ID as the default owner of newly created files. Any files needed by that program would have their access control lists (138 of FIG. 1) modified so that only that user can access them. All other files 136 (i.e., those not needed by the application) might have their access control lists set to prohibit access by that user.

It will be apparent to those skilled in the art that many modifications and variations may be made to the preferred embodiments of the present invention, as set forth above, without departing substantially from the principles of the present invention. For example, the present invention can be used to create a secure execution environment for any computer program that uses attributes to define access and security parameters. All such modifications and variations are intended to be included herein within the scope of the present invention, as defined in the claims that follow.

What is claimed is:

1. A system for establishing a secure execution environment for a software process executed by a program operating on a computer, comprising:

a software process operating on a computer, said software process including a plurality of attributes;

an operating system kernel in communication with said software process and in communication with an executable file to be accessed by said software process; and a system call trap associated with said operating system kernel, said system call trap configured to modify the plurality of attributes for the software process in said operating system kernel based on an executable environment attribute stored in association with said executable file, such that when said executable file is executed, a new software process attribute is set as a function of the executable environment attribute.

2. The system of claim 1, wherein said system call trap further comprises:
a process attribute extension; and
an access token extension associated with said process attribute extension, said access token extension including said executable environment attribute.

3. The system of claim 1, wherein said executable environment attribute is contained in a database associated with said executable file.

4. The system of claim 1, wherein said executable environment attribute is chosen from the group consisting of user ID, group IDs and privileges.

5. The system of claim 1, wherein said execution environment attribute isolates said software process from any other software process operating on said computer.

6. The system of claim 1, wherein said software process is a web server process.

7. The system of claim 1, wherein said software process is a file transfer process.

8. The system of claim 1, wherein said software process is a mail server process.

9. The system of claim 1, wherein said executable environment attribute is associated to said software process upon execution of said software process.

10. The system of claim 1, wherein said executable environment attribute replaces any existing attributes associated with said software process.

11. The system of claim 1, wherein the system call trap is further configured to determine whether the execution environment attribute contains an inherit flag.

12. The system of claim 11, wherein the system call trap is further configured to store a current attribute for a current process when the execution environment attribute contains an inherit flag.

13. The system of claim 12, wherein the system call trap is further configured to:
determine whether the current attribute for the current process contains the inherit flag;
merge the execution environment attribute with a previously stored attribute if the current attribute does not contain the inherit flag; and
merge the execution environment attribute with the current attribute if the current attribute does contain the inherit flag.

14. A method for establishing a secure execution environment for a software process executed by a program operating on a computer, the method comprising:
operating a software process on a computer, said software process including a plurality of attributes;
executing an operating system kernel in communication with said software process, said operating system kernel in communication with an executable file to be accessed by said software process; and
modifying the plurality of attributes for the software process based on an executable environment attribute stored in association with the executable file, such that when said executable file is executed, a new software process attribute is set as a function of the executable environment attribute.

15. The method of claim 14, further comprising:
executing a process attribute extension; and
executing an access token extension associated with said process attribute extension, said access token extension including the executable environment attribute.

16. The method of claim 14, wherein the executable environment attribute is contained in a database associated with said executable file.

17. The method of claim 14, wherein said the executable environment attribute is chosen from the group consisting of user ID, group IDs and privileges.

18. The method of claim 14, wherein said execution environment attribute isolates said software process from any other software process operating on said computer.

19. The method of claim 14, wherein said software process is a web server process.

20. The method of claim 14, wherein said software process is a file transfer process.

21. The method of claim 14, wherein said software process is a mail server process.

22. The method of claim 14, wherein the executable environment attribute is associated to said software process upon execution of said software process.

23. The method of claim 14, wherein the executable environment attribute replaces any existing attributes associated with said software process.

24. The method of claim 14, further comprising determining whether the execution environment attribute contains an inherit flag.

25. The method of claim 24, further comprising storing a current attribute for a current process when the execution attribute contains an inherit flag.

26. The method of claim 25, further comprising:
determining whether the current attribute for the current process contains the inherit flag; and
merging the execution environment attribute with a previously stored attribute if the current attribute does not contain the inherit flag.

27. The method of claim 25, further comprising:
determining whether the current attribute for the current process contains the inherit flag; and
merging the execution environment attribute with the current attribute if the current attribute does contain the inherit flag.

\* \* \* \* \*

UNITED STATES PATENT AND TRADEMARK OFFICE
CERTIFICATE OF CORRECTION

| | | |
|---|---|---|
| PATENT NO. | : 7,398,532 B1 | Page 1 of 1 |
| APPLICATION NO. | : 09/517366 | |
| DATED | : July 8, 2008 | |
| INVENTOR(S) | : Jeffrey S. Barber et al. | |

It is certified that error appears in the above-identified patent and that said Letters Patent is hereby corrected as shown below:

On the Title page, in Item (56), under "Foreign Patent Documents", in column 2, line 2, delete "EP   0 573 248   A1   12/1993".

In column 4, line 44, delete "166" and insert -- 106 --, therefor.

In column 10, line 19, in Claim 17, after "said" delete "the".

Signed and Sealed this

Thirty-first Day of March, 2009

JOHN DOLL
*Acting Director of the United States Patent and Trademark Office*